United States Patent [19]
Lee et al.

[11] 4,356,297
[45] Oct. 26, 1982

[54] IN-SITU FORMATION OF A DIPRIMARY AMINE CURING AGENT

[75] Inventors: Yue G. L. Lee, Schenectady; Charles D. Dudgeon, Clifton Park, both of N.Y.

[73] Assignee: General Electric Company, Schenectady, N.Y.

[21] Appl. No.: 225,108

[22] Filed: Jan. 14, 1981

[51] Int. Cl.$^3$ .............................................. C08G 18/30
[52] U.S. Cl. ........................................ 528/44; 528/45; 528/363; 528/349
[58] Field of Search .................... 528/44, 45, 363, 349

[56] References Cited
U.S. PATENT DOCUMENTS

| 3,426,098 | 2/1969 | Meyer et al. | 260/841 |
| 3,560,446 | 2/1971 | Zecher et al. | 260/18 TN |
| 3,567,673 | 3/1971 | Payette | 260/33.6 |

FOREIGN PATENT DOCUMENTS 973377 10/1964 United Kingdom .

Primary Examiner—Maurice J. Welsh
Attorney, Agent, or Firm—Hedman, Casella, Gibson & Costigan

[57] ABSTRACT

Reactions involving diprimary amines, e.g., methylenedianiline, particularly those forming polyesterimides are carried out using, in place of the diamine, a urethane compound capable of yielding the diamine at reaction temperatures. The preparation of wire enamels from polyesterimides thus prepared is particularly described.

10 Claims, No Drawings

IN-SITU FORMATION OF A DIPRIMARY AMINE CURING AGENT

This invention relates to a method for preparing polyesterimides and to compositions useful in preparing such polyesterimides. Such polyesterimides have found wide acceptance in the preparation of wire enamels which form hard, tough and solvent-resistant coatings on wire.

Polyesterimides known for this purpose include those formed by the reaction of diprimary amines, e.g., methylenedianiline,

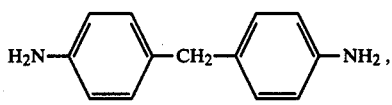

metaphenylenediamine, 2,4-diaminotoluene, oxydianiline, 1,6-hexamethylenediamine, and the like, trimellitic anhydride,

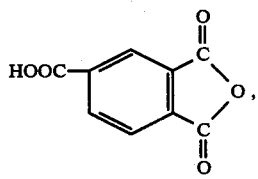

or another anhydride, such as pyromellitic dianhydride, benzophenone tetracarboxylic acid dianhydride, the adduct of two moles of trimellitic anhydride and bisphenol A, and the like, ethylene glycol, glycerine or tris(2-hydroxyethyl)isocyanurate (Theic) and terephthalic acid and/or isophthalic acid. The polyesterimides thus formed are complex copolymers having repeating imide linkages formed by the reaction of methylene dianiline with trimellitic anhydride and ester linkages formed by the reaction of ethylene glycol, terephthalic acid, trimellitic anhydride, as well as more complex structures formed by coreaction of the polyfunctional ingredients.

Such polyesterimides are known from British Pat. No. 973,377; U.S. Pat. Nos. 3,426,098 and 3,567,673, all incorporated herein by reference.

The known method of preparing such polyesterimides involves charging the ingredients to a suitable reaction vessel, preferably in the presence of a suitable catalyst, such as tetraisopropyl titanate, and heating to reaction temperatures with removal of water of reaction formed during the resin forming reactions. This method necessarily involves the shipment, storage and handling of the diprimary amide component, some of which are known to present certain health hazards to workers exposed to them.

This invention provides a means for utilizing the desirable qualities which the diprimary amine can contribute to a polymer, such as symmetry and rigidity of structure, without the necessity of exposing workers to this hazardous chemical.

According to this invention, the dimprimary amine is generated in situ in a polymer forming reaction by using, in place of diprimary amine, a compound which readily decomposes at reaction temperatures to yield the diprimary amine, which then reacts with other polyfunctional ingredients present in the reaction vessel. Thus, the methylenedianiline has only a transient existence in a closed reaction vessel, and thus presents no appreciable hazards to health in its use. Such a compound is the urethane formed by the reaction of diphenylmethane diisocyanate with tertiary butyl alcohol having the following structure:

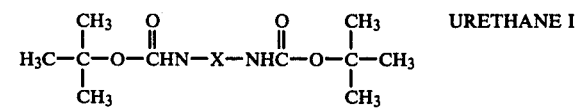

wherein X is a divalent hydrocarbon radical of from 2 to 30 carbon atoms, optionally including the groups —O—, —SO$_2$—, —S—, and other conventional functional groups.

Illustratively, group —X— is selected from

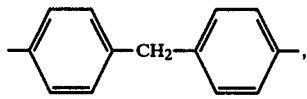

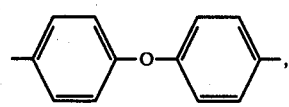

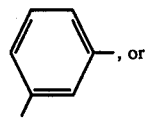

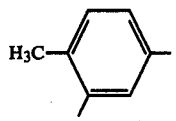

Unlike other so-called blocked isocyanates, which decompose on heating to yield the free isocyanate radical, the above urethanes decompose on heating to yield the corresponding diamine as follows:

Urethane I $\xrightarrow{\Delta}$

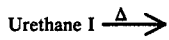

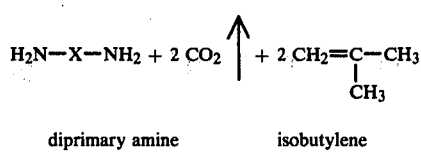

diprimary amine     isobutylene

As shown the coproducts of the decomposition reaction, carbon dioxide and isobutylene, are relatively volatile and are easily removed from the reaction vessel. Decomposition of the urethane appears to be initiated at reaction temperatures as low as 100° C. and continues at a more rapid rate at reaction temperatures of 120° C. to 250° C. and higher.

Obviously, the above Urethanes (I) are useful as sources of diprimary amines not only in the polyesterimide reaction indicated above, but are also useful in any chemical reaction involving such diprimary amines. Since these are well known in the literature, only a few need to be mentioned here. These would include reactions of the diprimary amine with dibasic acids, such as maleic, adipic and terephthalic acids, diisocyanates such as toluene diisocyanate, 4,4'-methyldiphenyl diisocyanate and the like. Also contemplated are reactions with dianhydrides, like pyromellitic dianhydride, benzophenonetetracarboxylic acid dianhydride, 1,4-butanetetracarboxylic acid dianhydride, etc. Thus, in its broadest aspect, the invention would include a reaction composition containing Urethane (I) and any chemical compound containing a radical reactive with a primary amino ($-NH_2$) group.

As indicated previously, the invention finds a very useful embodiment in the preparation of wire enamels utilizing primary diamines, e.g., methylenedianiline, as a reactant. The wire enamels made using Urethane (I) as a source of primary diamines have yielded coatings on wire with properties equivalent to those obtained with commercial products utilizing such amines directly in their preparation.

EXAMPLE 1

Part A—Preparation of Urethane I

Diphenylmethane diisocyanate 119 g (0.476 mole) and t-butanol 84 g (1.1333 mole) are charged to a five liter, three neck round bottom flask equipped with a stirrer, a thermometer, a condenser and an inlet for nitrogen to provide an inert atmosphere. The mixture is heated from room temperature to 80° C. in approximately 15 minutes and held at 80° C. until a solid urethane product is obtained.

During the course of the reaction, the mixture changes from a heterogeneous mixture to a clear homogeneous product and finally to a wet solid product (Urethane (I)). The urethane is not soluble in the excess t-butanol used for the reaction, so the excess alcohol is removed and the urethane air-dried at room temperature. It has a melting point of 183°–184° C.

Part B—Preparation of Polyesterimide

The following compositions were prepared as separate parts:

| Part | Materials | Charge (g) | % |
|---|---|---|---|
| I | Urethane I | 187 | 5.712 |
|   | Trimellitic Anhydride | 182 | 5.560 |
| II | Cresylic Acid | 273 | 8.340 |
|   | Ethylene Glycol | 64.7 | 1.976 |
|   | Theic* | 260 | 7.942 |
|   | Terephthalic Acid | 185 | 5.651 |
| III | Tetraisopropyl Titanate (TPT) | 1.5 | 0.046 |
|   | Cyclohexane | (20 + 25) | |

*Tris(2-hydroxyethyl)isocyanurate

Part I (Urethane I and trimellitic anhydride) and Part II (cresylic acid, ethylene glycol, Theic and terephthalic acid) are charged in sequence into a reaction vessel. Part III (cyclohexane and tetraisopropyl titanate) is added respectively to the decanter (cyclohexane) and the flask (tetraisopropyl titanate) while the mixture is stirred and heated from room temperature to 215° C.

At a reaction temperature of 100°–120° C., reflux of the cyclohexane begins, and the Urethane I solids completely disappear in the reaction solution at about 130° C. At this point decomposition of the Urethane I is initiated with the release of the methylenedianiline reactant and the volatile products, $CO_2$ and isobutylene, which are vented from the reaction mixture. Thereafter thickening occurs, due to the formation of amic acids, and a distillate of the water of reaction begins to condense in the condenser.

The reaction continues at about 215° C. until 100% of the theoretical amount of water (about 64 g) is removed. The viscosity of the resin at this point is Z 3½. The heating element was then turned off and the nitrogen flow increased to remove the solvent, cyclohexane.

The general procedure set forth in the abovementioned Payette patent, U.S. Pat. No. 3,567,673, Example 1 is then followed to prepare a wire coating composition. The resin is cut with a solvent mixture comprising cresylic acid, phenol and aromatic hydrocarbon solvent, then a polyisocyanate (Mondur SH), a phenolic resin, tetraisopropyltitanate and minor amounts of other conventional ingredients are added.

The finished product is a polyesterimide enamel having a solids content of 27±1%, a viscosity of 650±100 centistokes, and a resin acid number of 1–2 mg KOH/gm.

The finished enamel is applied to wire and baked in a conventional manner, as described in the above-mentioned U.S. Pat. No. 3,567,673. The properties of the coating were almost equivalent to those of a corresponding product in which methylenedianiline was used directly as a reactant, except that the heat shock was lower.

EXAMPLE 2

To demonstrate this, the composition of Example 1 is applied to 0.0403" copper wire as a sole coat in a commercial wire tower. A final build of 2.9 to 3.1 mil is obtained. The following properties are observed:

| Speed (ft/min) | 50 | 60 | 65 |
|---|---|---|---|
| Flexibility 25+ | 1X | 2X | 2X |
| Heat shock | | | |
| 20% 30 min - 200° C. | 3X | 3X | 3X |
| | OK | fails | fails |
| Cut through Temperature | | | |
| °C. at 2000g | 398 | 386 | 336 |

An excellent quality smoothly coated insulated conductor is obtained at the slower of the three coating speeds.

In the foregoing Examples, Theic used in Part II, is a tris(2-hydroxylethyl)isocyanurate which enters into the resin forming reaction. In its place, other trihydroxy alcohols, such as glycerine, may be used. Mondur SH is an isocyanurate blocked by cresol and is a conventional additive.

The foregoing example demonstrates that Urethane I can be successfully substituted for methylenedianiline in the preparation of a wire enamel. In like manner Urethane I can be made from oxydianiline, metaphenylenediamine, hexamethylenediamine, etc., and can be substituted for such amines in any of the known chemical reactions of these amines.

Many other variations will suggest themselves to those skilled in the art. All such obvious variations are within the full scope of the appended claims.

We claim:
1. A composition of matter comprising a urethane of the formula:

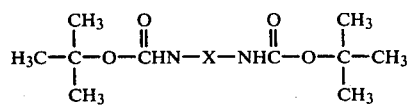

wherein X is a divalent hydrocarbon radical of from 2 to 30 carbon atoms, optionally including the group —O—, —SO₂—, —S—, and an organic compound containing one or more radicals reactive with a primary amino group.

2. A composition of matter as claimed in claim 1 wherein the divalent radical X is selected from

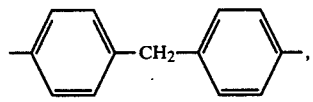

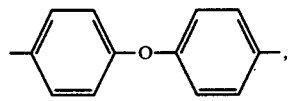

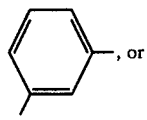

-continued

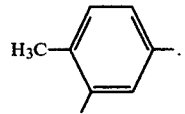

3. A composition of matter as claimed in claim 2 wherein the divalent radical X is

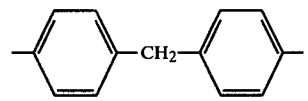

4. A composition of matter as claimed in claim 1 in which the organic compound is trimellitic anhydride.

5. A composition of matter as claimed in claim 1 in which organic compound is terephthalic acid.

6. A composition of matter as claimed in claim 1 in which the organic compound is an isocyanate.

7. A composition of matter comprising a urethane of the formula given in claim 3, trimellitic anhydride, ethylene glycol, Theic and terephthalic acid.

8. A process which comprises heating a urethane of the formula given in claim 1 to its decomposition temperature with an organic compound containing one or more radicals reactive with a primary amino group, decomposing said urethane to form a diprimary amine and further reacting the diprimary amine thus formed with said organic compound.

9. Process as claimed in claim 8 in which said compound is trimellitic anhydride.

10. Process as claimed in claim 8 in which said compound is terephthalic acid.

* * * * *